Patented May 21, 1929.

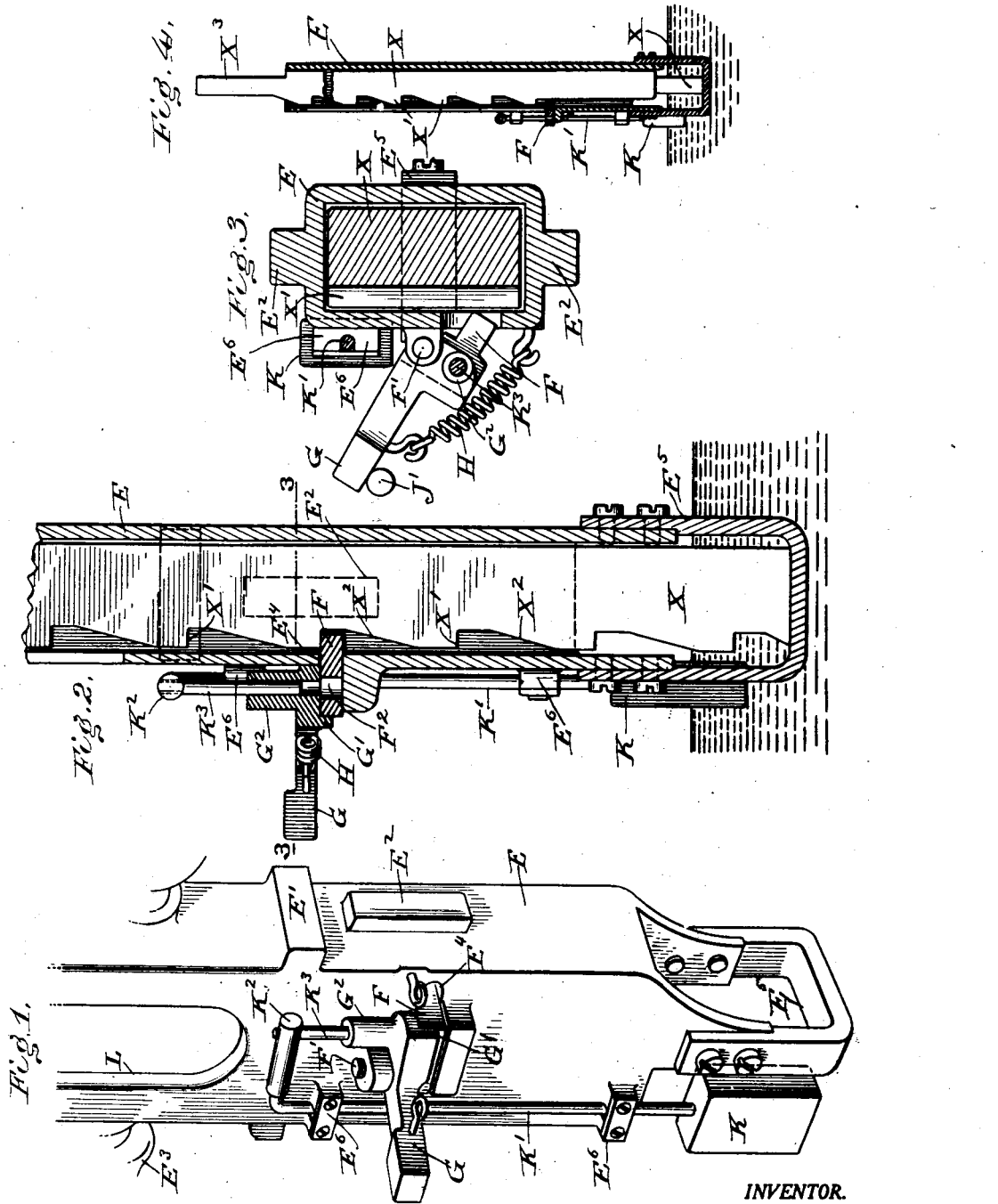

1,713,606

UNITED STATES PATENT OFFICE.

DAVID S. KENNEDY, OF BROOKLYN, NEW YORK, ASSIGNOR TO MERGENTHALER LINOTYPE COMPANY, A CORPORATION OF NEW YORK.

TYPE-METAL BAR OR PIG FOR POT FEEDERS.

Original application filed July 11, 1924, Serial No. 725,343. Divided and this application filed March 30, 1928. Serial No. 265,963.

In my co-pending application Serial No. 725,343, filed July 11, 1924, there is disclosed an improved form of type-metal bar feeding mechanism for supplying cold metal to the melting pot of a linotype machine, said mechanism consisting of a guide or chute for the metal bars or pigs, and an automatic pawl or detent which cooperates with the bars or pigs to advance them step by step into the molten metal.

The present application, which is a division of the foregoing application, is directed to the type-metal bar or pig per se as used in connection with the above mentioned feed mechanism, altho it will be understood that the type-metal bar will be equally useful in connection with other forms of mechanism as well.

In the accompanying drawings:

Fig. 1 is a perspective view of the pot feeder forming the subject matter of my co-pending application Serial No. 725,343 above referred to;

Fig. 2 is a vertical section taken thru the guide or chute and showing one of the metal bars in cooperation with the automatic feed pawl;

Fig. 3 is a cross-section taken on the line 3—3 of Fig. 2, but showing the pawl withdrawn from the guide to release the metal bar; and Fig. 4 is a view similar to Fig. 2, on a greatly reduced scale, showing both ends of the metal bar, and the manner in which it is allowed to follow the preceding one thru the guide.

In carrying out the present invention, the cold metal to be supplied to the pot is in the form of long bars or pigs X, which may be of any suitable length and of any desired form in cross-section, and which are provided with a series of squared-off arresting teeth or shoulders $X^1$. In the example illustrated, the teeth are cast on one of the side faces of the bars and extend entirely across the same from one edge to the other, the rear walls $X^2$ of the intermediate recesses sloping upwardly toward the shoulders to facilitate their cooperation with the feed pawl. The metal bars X are fed into the pot thru a suitable guide or chute E extended downwardly thru an opening in the pot cover. As a convenient means of support, the chute is provided at its opposite edges with horizontal ribs or ledges $E^1$ and vertical tongues $E^2$, the latter being fitted in slots formed in the opposing faces of a pair of upright supports on the pot cover, and the former resting upon the upper edges of said supports. As thus supported, the chute E and all of its attached parts may be readily applied to and removed from the pot at will. The chute is provided with a pair of grip handles $E^3$ to facilitate such manipulation.

The feeding of the metal bars thru the chute E is controlled by a pawl or detent F pivoted by a pin $F^1$ to the side of the chute and adapted to be rocked into and out of engagement with the metal bar thru an aperture $E^4$ cut thru the side of the chute. As shown in Fig. 2, when the pawl F is in active position, it stands in engagement with one of the shoulders $X^1$ and positively prevents the descent of the bar. When, however, the pawl is withdrawn or moved to inactive position (Fig. 3), it clears the shoulders $X^1$ and permits the bar to slide downwardly along the chute. In this connection, it may be noted that the chute is provided at its lower end with a steel strap or stirrup $E^5$ which limits the descent of the metal bar when released by the pawl. After the metal bar has thus been released, the pawl F is returned to active position in time to be engaged by the following shoulder $X^1$ and again limit the descent of the bar until the time arrives for the next release of the bar. In this way, the pawl, and particularly in cooperation with the strap $E^5$, exercises a positive control over the metal bar and insures its progressive step-by-step advance into the pot under the action of gravity.

Directly above the pawl F and mounted to turn on the same pivot pin $F^1$, is a right-angular actuating lever G, the shorter arm of which is formed with a depending lip $G^1$ arranged to engage the outer edge of the pawl F. A helical spring H, connected at one end to the longer arm of the actuating lever G and at its opposite end to the side of the chute E, tends constantly to hold the lip $G^1$ in engagement with the pawl F and the latter in active position, or in engagement with the metal bar. When the melting pot is swung forward to casting position, the longer arm of the actuating lever G engages an upright pin $J^1$ of a stationary bracket (not shown) and is rocked rearwardly on the pivot $F^1$ against the action of the spring H (see Fig. 3).

So long as the molten metal in the pot is at the desired level, the rocking movements of the actuating lever G do not affect the pawl F, which remains projected into the chute E to prevent the release or descent of the metal bar; but when the metal falls below such level, the pawl is automatically coupled to the actuating lever and withdrawn from the chute so as to release the metal bar in the manner before described. Such action of the parts is controlled by a float K located in the melting pot and resting in the molten metal. This float is connected to the lower end of a vertical rod or stem $K^1$ slidable in guides $E^6$ on the side of the chute and bent at right angles at its upper end to make telescopic connection with a sleeve $K^2$ carrying a vertical coupling pin $K^3$. This pin $K^3$ passes downwardly thru a tubular boss $G^2$ rising from the shorter arm of the actuating lever G and is adapted to be lowered into or lifted out of engagement with a hole or recess $F^2$ formed in the pawl F according to the position of the float K.

From the foregoing, it will be seen that the actuating lever G is rocked to and fro at each casting operation, being moved in one direction by its engagement with the stationary pin $J^1$ as the melting pot advances to casting position, and in the opposite direction by the spring H as the pot retreats from casting position. Such to-and-fro motions of the actuating lever are purely idle and do not affect the pawl F until the molten metal in the pot drops below the desired level. When this occurs, as above intimated, the float K lowers the coupling pin $K^3$ into the recess $F^2$ of the pawl F and connects the latter to the actuating lever. Due to this connection of the parts, upon the next advance of the melting pot to casting position, the pawl F is withdrawn from the chute E and becomes disengaged from the tooth $X^1$ on the metal bar X (see Fig. 3), permitting the latter to slide downwardly by gravity into the melting pot until it is arrested by the strap $E^5$. The metal bar, in entering the molten metal, displaces the same and forces the float K upwardly, thereby lifting the coupling pin $K^3$ out of engagement with the recess $F^2$ and disconnecting the pawl from the actuating lever G. Consequently, when the melting pot recedes, the spring H acts instantly to rock the actuating lever G back to its original position and at the same time, due to the engagement of the lip $G^1$ with the pawl F, to project the latter back into the chute E for engagement with the next tooth $X^1$ on the metal bar. The pawl F then remains in this position until it is again coupled to the actuating lever by the lowering of the float K, the foregoing operations being repeated whenever the molten metal falls below the desired level. In this way, the metal bars are fed into the pot step by step under positive control and in such manner that the molten metal is kept at a substantially constant level and at a practically uniform temperature.

It may be observed that when the last or uppermost tooth on the metal bar passes the pawl F, the bar is then free to pass into the melting pot as rapidly as it is fused. This would result in a slight raising of the metal within the pot above the level desired, if the bar were of uniform bulk thruout. To avoid this result, the upper end portion of the bar is preferably reduced or cut away, as at $X^3$ (see Fig. 4), so that the continued fusion thereof will not cause the molten metal to rise excessively, the latter being thus kept at approximately the same level at all times. As an alternative, the pawl F might be placed at a lower level or nearer the lower end of the guide or chute E, if desired. It may also be observed that, by reason of the foregoing condition, a new bar when placed in the chute to follow its predecessor, if formed with teeth $X^1$ thruout its extent, would be arrested by the engagement of the pawl F with its first or lowermost tooth, and when released, caused to drop the full distance from the pawl to the strap $E^5$. While this would not be serious, it may be avoided by omitting the teeth $X^1$ at the lower end of the bar, as also indicated in Fig. 4, which shows a new bar resting upon the remaining portion of the preceding bar. It will be apparent from this figure that as the old bar melts away, the new bar is permitted to slide down the chute until arrested by the engagement of its first tooth with the pawl F, at which time the end of the bar will stand only a short distance away from the strap $E^5$.

Having thus described my invention, its construction and mode of operation, what I claim and desire to secure by Letters Patent of the United States, is as follows:

1. A type-metal bar formed on one of its faces with a series of arresting shoulders, said shoulders terminating short of the lower end of the bar, for the purpose described.

2. A type-metal bar having a reduced upper end portion and formed on one of its faces with a series of arresting shoulders, for the purpose described.

3. A type-metal bar formed on one of its faces with a series of arresting shoulders, the said shoulders terminating short of the upper and lower end portions of the bar, and the upper end portion being reduced or cut away, for the purpose described.

In testimony whereof, I have affixed my signature hereto.

DAVID S. KENNEDY.